UNITED STATES PATENT OFFICE 2,628,781

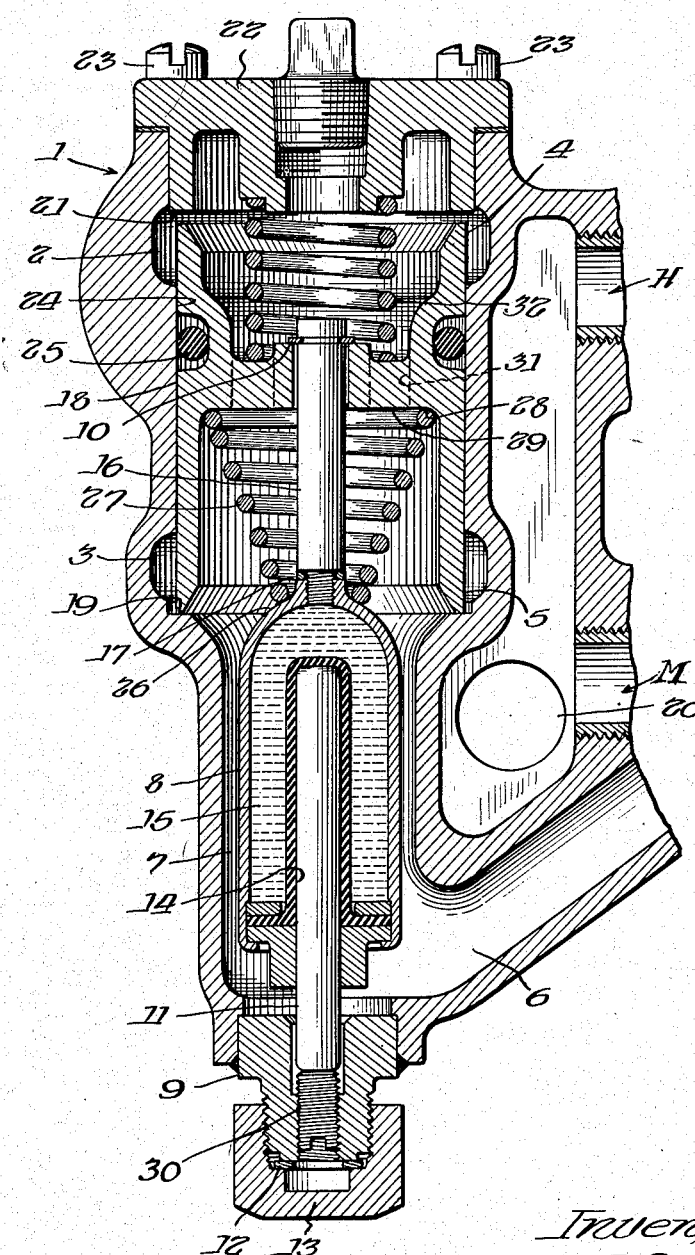

THERMOSTATIC MIXING VALVE

Francis J. Cantalupo, Chicago, Ill., assignor to Crane Co., Chicago, Ill., a corporation of Illinois Application April 22, 1949, Serial No. 89,031

1 Claim. (Cl. 236—12)

This invention relates to a valve for use on automatic washing machines or the like, and more specifically, it is directed to a device in combination therewith for taking care of what is termed the overrun of the thermostatic element employed in connection with such devices.

At the outset, in order to obtain a better appreciation of the need and background of this invention, it should be understood that in thermostatically controlled mixing valves for automatic washing machines positive means should be provided for properly handling the overrun of the thermal element in the event of a failure in the cold water supply or a valve leak prevents the complete shut-off of the hot water supply when desired. Heretofore, in providing for such devices, expensive remedies have been resorted to, frequently leading to costly installations, and still in many instances, being unable to handle the overrun promptly and positively, thereby resulting in damage to the thermal element employed.

It should be understood in connection with thermal devices of this type, for example of the kind described in my co-pending patent application, Serial No. 71,977, filed January 21, 1949, now abandoned, that when a failure has occurred in the cold water supply line connected to a mixing valve of the type referred to, the resulting surge of hot water will create a condition in which the valve may be closed tight, in which case an overrun prevention provision is hardly necessary. But, in many instances, due to the fact that the thermally actuated valve closure member does not seat absolutely tight, hot water may continue to leak past the valve seat and thereby place the thermal element under exceedingly high strains, resulting in breakage of the thermal element or one of its co-related operating parts; such as the shaft, for example. Thus, it is another object of this invention to provide for a structure in which such damage or breakage cannot occur and in which the valve and thermal overrun preventer may be made relatively short and compact insofar as their respective space requirements are concerned with fewer and cheaper parts.

Other objects and advantages will become more readily apparent in connection with the accompanying drawings read in light of the following specification, in which is shown a single preferred embodiment of my invention.

Referring to the drawing, a conventional washing machine mixing valve body 1 is shown having the usual valved inlets (not shown), supplying the annular spaced-apart chambers 2 and 3, respectively, with hot and cold water. The inner annular limits of the chambers 2 and 3 are defined, as indicated at 4 and 5, respectively, by the surfaces forming the respective end peripheries of the closure member hereinafter described in greater detail. Thus, depending upon the position of the valve closure member, the mixed water discharges from the chamber or passage 6. The latter passage is in communication with the annular body chamber 7 containing the thermal actuating unit 8, which unit is supported by the internally threaded collar 9 held in soldered position within the body 1, as indicated. Preferably, it is locked thereto by means of the collar gasket 12 and the enclosing cap 13 to provide for accessibility in making necessary adjustments in axially positioning the thermal unit shaft 11. The thermal unit 8 surrounds an end and substantial length portion of the shaft 11, as at 14, in a frictional grip, the unit containing at 15 such thermally responsive liquid as a polymer fluid, which has been found to be desirably sensitive to changes in the temperature of the entering mixed liquid received from the respective hot and cold water chambers 2 and 3 and thence into the chamber 7. From the discharge passage and by valved means (not shown), the mixed liquid flows into the opening M and thence through the outlet 20 into the washing machine or the like. A separate outlet H for hot water may be provided if desired.

At the upper end of the thermal unit 8, a guide shaft 16 is arranged, being threadedly connected thereto as shown and in fluid sealing relation by means of the gasket 17. At its top end, the guide shaft 16 is held in shouldered relation to the piston-type valve closure member 18 by means of the split washer 10, the said latter guide shaft thereby being reciprocably movable predeterminedly upward relative to the member 18 in response to the axial movement initiated by the thermal unit 8 when responding to temperature changes. In its lowermost position, the piston closure member 18 seats as at 19. In the opposite direction, under the maximum expanded condition of the unit 8, the closure member will seat on the surface 21 of the cap 22. The latter member 22 is retained in fluid tight relation to the body 1 by means of the cap screws 23. The piston is preferably maintained in fluid sealing relation to the bore 24 of the body or casing 1, by means of the sealing O-ring 25 mounted in an annular chamber as indicated.

An important contribution relative to my invention lies in the employment of resilient means preferably interposed between the outer surface 26 of the thermal unit 8. The resilient means for illustrative purposes, takes the form of a conical coiled spring 27 which at its larger end is shouldered against the annular surface 28 of the apertured bridge 29 of the piston closure member 18. At the opposite side of the apertured bridge 29, which is provided with the annularly arranged passages 31, a lighter weight coiled spring 32 is mounted. After the thermal unit 8 with the spring 27 in place around the shaft 16 has been positioned in piston-like closure member 18, the spring 27 is then compressed until the groove on shaft 16 protrudes sufficiently above the bridge wall to attach the retaining split washer 10. The groove or shaft 16 is located to obtain adequate loading, preferably so as not to deflect the latter spring member 27 bearing against the piston closure 18 to move the said closure against the smaller opposed load provided by the coiled spring 32.

Thus, it will be apparent that the piston closure member 18, the complete thermal unit parts 8, 11, 16, the conical spring 27, and the retaining split washer 10 constitute a separate sub-assembly, which sub-assembly is insertable into valve body 1 and the piston spring 32 and the cap 22 are then placed in position.

The desired mixed water temperatures are obtained by the use of adjusting screw 30, rotating the latter member clockwise reduces the gap between the separate thermal unit shaft 11 and the screw 30, thus allowing the piston closure member 18 to be more readily actuated. This arrangement results in a lower temperature of the mixed water, since the sooner the closure member is actuated so much more quickly is cold water added, and thereby further lowering the mixed water temperature. A greater volume of hot water is assured by turning adjusting screw 30 counterclockwise, a larger gap being created between the shaft 11 and the screw 30. Thus, the temperature of the mixed water normally admitted would be higher before actuation of the closure member 18 takes place. Thus, it will be clear that if an overrun of the thermal unit 8 occurs for any reason, the spring 27 will be compressed further to provide for the overrun, the upper end of the shaft 16 and the washer 10 then moving upwardly into the space defined by the coiled spring 32. In summary, if a cold water failure occurs or the hot water cannot be shut off within the valve, the shaft 16 will be moved axially upwardly and the piston-type closure 18 will be moved against the annular seat 21. Due to the advantages gained by employing the construction of this invention, any additional increase in the temperature of the hot water will then force the overrun spring 27 to be compressed, permitting the shaft 16 to move inwardly as far as may be necessary relative to the said piston-type closure member. Thus, it will be apparent that by virtue of the said spring 32, the piston is normally held against the lower seat 19. Thus, should the surge of hot water continue, the piston having already been seated against the surface 21 and the shaft 16 being stopped in abutting end relation against the adjusting screw 30, the thermal unit may continue to expand, and thus force the overrun spring 27 to be compressed thereby permitting the shaft to move as far as necessary to allow for the added expansion of the unit.

Heretofore, in constructions of this type, the shaft 16 has been badly bent and damaged under conditions of an overrun, and this objection has also applied to the thermal unit shaft 11. In the novel construction of this invention, however, such breakage cannot occur, with the result that injury from escaping hot water is substantially avoided. The thermal unit is therefore fully protected together with the operating parts; such as the pistons and the respective upper and lower shafts.

It should, of course, be clear that the detailed manner of providing for such overrun between the thermal unit and the piston may be obtained by the employment of other forms of resilient members, so that the particular structure illustrated is only for the purpose of showing a preferred embodiment. The scope of the invention, therefore, should be measured by the appended claim.

I claim:

In means for providing for the overrun of an axially expandible thermal element in a mixing valve or the like, the combination comprising a valve casing, a thermal element within the casing, a reciprocally movable piston-like closure member cooperating with the said thermal element and having oppositely disposed end seating surfaces for engagement with the said valve casing, the said thermal element being movably attached to the said reciprocally movable closure member, the latter member having an apertured bridge portion with resiliently mounted means bearing on each side of the apertured bridge for permitting limited axial movement of the closure member in opposite directions, said resiliently mounted means including one resilient element disposed between the reciprocally movable member and the said thermal element for normally holding said reciprocally movable member and the thermal element in spaced-apart relation, a shaft limitedly movable reciprocally with the thermal element relative to the said reciprocally movable member, and stop means on the said shaft bearing against a shoulder on the apertured-bridge portion to limit the axial movement thereof in one direction relative to the said closure member, the other of said resiliently mounted means limiting the axial movement of the said closure member in the opposite direction relative to the said shaft.

FRANCIS J. CANTALUPO.

REFERENCES CITED

The following references are of record in the file of this patent:

UNITED STATES PATENTS

| Number | Name | Date |
|---|---|---|
| 1,195,722 | Powers et al. | Aug. 22, 1916 |
| 1,434,542 | Horne | Nov. 7, 1922 |
| 2,045,289 | Bolin | June 23, 1936 |
| 2,061,915 | Mavtsch | Nov. 24, 1936 |
| 2,369,242 | Lawler | Feb. 13, 1945 |